(12) United States Patent
Sadahiro

(10) Patent No.: US 6,795,757 B2
(45) Date of Patent: Sep. 21, 2004

(54) ON-VEHICLE DISPLAY DEVICE

(75) Inventor: Takashi Sadahiro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/617,759

(22) Filed: Jul. 14, 2003

(65) Prior Publication Data
US 2004/0036769 A1 Feb. 26, 2004

(30) Foreign Application Priority Data
Aug. 26, 2002 (JP) .................................. P 2002-245242

(51) Int. Cl.⁷ .................................................. H04N 7/18
(52) U.S. Cl. ........................................ 701/29; 348/148
(58) Field of Search .............................. 701/29, 34, 39, 701/36, 45; 348/148, 835, 204, 87, 85; 340/425.5, 438

(56) References Cited

U.S. PATENT DOCUMENTS

2003/0007227 A1 * 1/2003 Ogino ........................ 359/227
2003/0009270 A1 * 1/2003 Breed .......................... 701/29

FOREIGN PATENT DOCUMENTS

| JP | 1-74682 U | 5/1989 |
| JP | 2-254489 A | 10/1990 |
| JP | 11-129815 A | 5/1999 |

* cited by examiner

Primary Examiner—Marthe Y. Marc-Coleman
(74) Attorney, Agent, or Firm—Birch, Stewart Kolasch & Birch, LLP

(57) ABSTRACT

An on-vehicle display device including a display unit installed in a cabin of a vehicle for displaying information, a vehicle condition detection unit for detecting a current vehicle condition, a sitting state detection unit for detecting a passenger's current sitting state in each of seats in the cabin, a rearward visibility detection unit for detecting driver's rearward visibility, a determination unit for determining an optimal position and an optimal direction of a display portion of the display unit based on the detected vehicle condition, the detected sitting state and the detected driver's rearward visibility, and a drive unit for changing a position and a direction of the display portion of the display unit based on a determination result obtained by the determination unit.

12 Claims, 6 Drawing Sheets

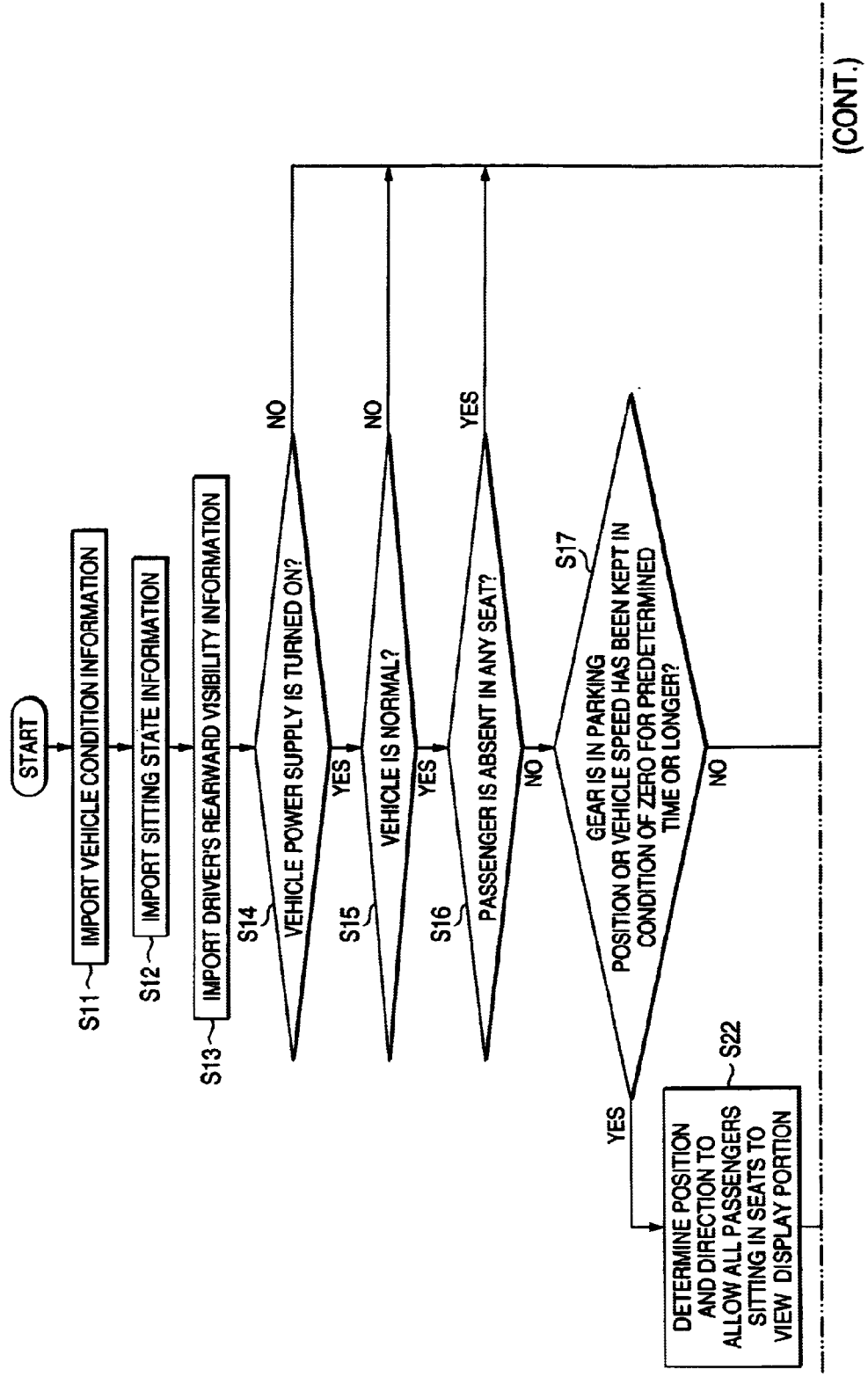

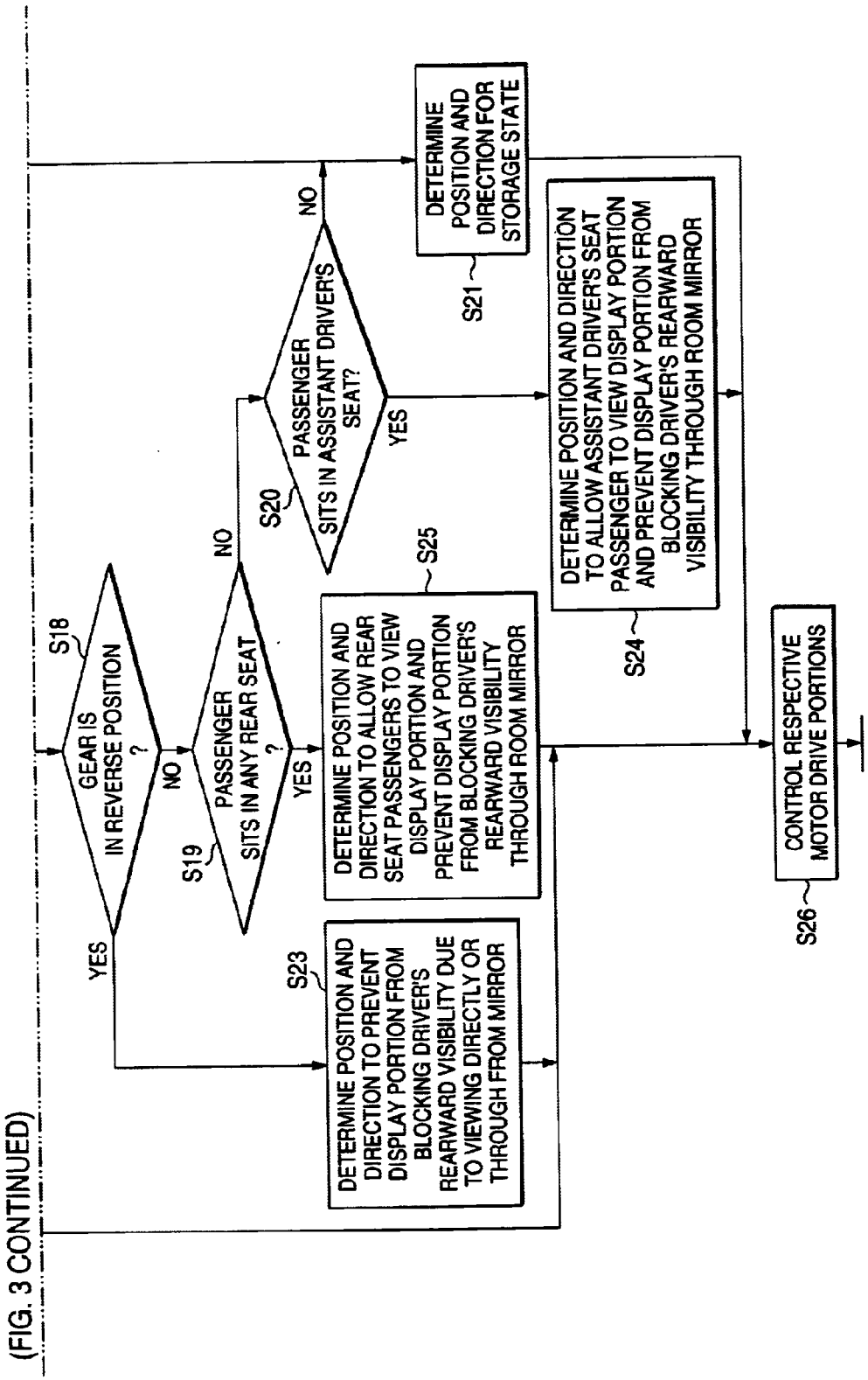

ON-VEHICLE DISPLAY DEVICE

BACKGROUND OF THE INVENTION

1. Field of the Invention

The present invention relates to a display device mounted in a vehicle and particularly to an on-vehicle display device by which a rear seat passenger can watch various videos in the vehicle.

2. Description of the Related Art

FIG. 6 is a schematic view showing a configuration of a related-art on-vehicle display device as to how to dispose the on-vehicle display device in a cabin. The related-art on-vehicle display device allows a person in a rear seat 2 of a vehicle 1 to enjoy watching video with sound from a television set, a Video Tape Recorder (VTR), a Digital Video Disc (DVD), a car navigation system, etc. The on-vehicle display device has a rear seat display 4 installed at a place where a rear seat passenger 3 sitting in the rear seat 2 can watch the video. Video playback systems such as a television tuner, a VTR player, a DVD player and a car navigation system are connected to the rear seat display 4, so that the rear seat passenger 3 can enjoy various kinds of videos and sounds thereon. In addition, in some cases, these video playback systems may be integrally built in the rear seat display 4.

The rear seat display 4 has a storage portion 4a, a rotary portion 4b and a display portion 4c. The storage portion 4a is fixedly attached to a place near the center of the ceiling portion in the cabin. The display portion 4c is attached to the storage portion 4a through the rotary portion 4b so that the display portion 4c can be opened/closed. When not in use, the display portion 4c is rotated manually in the direction of the arrow shown in FIG. 6 so as to be received in the storage portion 4a. The display portion 4c is opened as shown in FIG. 6 only when it is to be used.

Sound accompanying video displayed on the rear seat display 4 is delivered to a speaker in the cabin or to headphones, earphones and the like worn by the rear seat passenger 3. Operation such as selection of kind of video displayed on the rear seat display 4, channel switching of the television set or DVD playback is carried out by a dedicated remote controller, by pressing buttons on an operation panel provided in the rear seat display 4, or by any other means.

As a mode for installing the rear seat display 4, there can be used various modes such as a mode in which the rear seat display 4 is suspended from the ceiling as shown in FIG. 6, a mode in which the rear seat display 4 is imbedded in a headrest of a front seat 5 or in the back of a front seat 5, and a mode in which the rear seat display 4 is mounted on a console box or a floor surface. In each of these modes, the rear seat display 4 is configured so that the rear seat display 4 can be received not to be a hindrance when not in use, and that the rear seat display 4 can be opened only when it is to be used. With such a configuration, a passenger can stretch his or her hand to set the display portion 4c in a position easy to view, and press operation buttons or the like to make operations such as selection of kind of video to be played back, channel switching, angular or positional adjustment of the screen, and sound volume control.

When the rear seat display 4 is attached to the ceiling portion between the front seats 5 and the rear seats 2 in the cabin as shown in FIG. 6, it is necessary to secure the rearward visibility of the driver 6 due to rearward viewing directly or through a room mirror 7, from the point of view of safety. There are however a lot of constraints on height of the ceiling portion in the cabin, size of the display, attachment position of the display, and the like.

Some vehicles are so low in height of the ceiling portion in the cabin that the rearward visibility of the driver 6 cannot be secured when the rear seat display 4 is attached. In such a case, the place of installing the rear seat display 4 may often have to be changed or the attachment of the rear seat display 4 per se may often have to be given up.

When the driver 6 has to confirm safe conditions behind the vehicle 1 by rearward viewing directly or through the room mirror 7 while the vehicle is being driven forward or backward, the rear seat display 4 can be received, rotated or moved manually to secure the rearward visibility of the driver 6. Such operation is however troublesome, and it can hardly be said that the rear seat passenger 3 can enjoy watching the displayed video pleasantly.

Various solutions to the problem have been therefore proposed to positively use the rear seat display 4 for the driver 6 to confirm safe conditions behind the vehicle 1.

For example, JP-A-11-129815 has disclosed a method in which a driver can confirm a rear spot in the dead angle by viewing a camera image displayed on the display in such a posture that the driver looks backward for confirming safe conditions behind the vehicle by eye observation while driving the vehicle backward. The system for confirming safe conditions behind a vehicle has a control portion. When backward driving of the vehicle is detected by a backward driving detection switch, the control portion starts a rearward-looking camera picking up an image behind the vehicle, displays the picked-up image on a display, and makes a display drive portion change the direction of the display surface of the display so that the driver can view the display surface. In this manner, the driver can confirm safe conditions behind the vehicle by eye observation by watching the conditions behind the vehicle with the driver's face turned backward while driving the vehicle backward. Moreover, the driver can confirm the state of the rear spot in the dead angle by watching the image displayed on the display surface of the display which surface should be ordinarily turned to allow the rear seat passenger to view the display surface.

In addition, JP-A-2-254489 has disclosed a method in which a liquid crystal display is disposed horizontally rotatably in an intermediate portion between front seats and rear seats of a vehicle and in which both video signal switching and display unlocking are performed at the time of driving the vehicle backward so that both the confirmation of safe conditions behind the vehicle and the reception of a television image can be performed by one display. In the on-vehicle liquid crystal display device, a rotary shaft provided in the liquid crystal display is inserted into a fixed base through a plate spring and attached to an E-ring so that the rotary shaft can rotate. A rotary plate is further integrally attached to the rotary shaft so that the rotary plate can rotate together with the rotary shaft. When the driver shifts into reverse gear to drive the vehicle backward, a reverse gear detection signal is output. In response to the reverse gear detection signal, an unlocking unit operates to disconnect an iron core from the rotary plate so that the rotary plate can rotate to a position where the driver can view the liquid crystal display directly. Then, a display position detection switch is turned off and a video changeover switch is turned to the rearward-looking camera side. In this manner, both the confirmation of safe conditions behind the vehicle and the reception of a television image can be performed safely by one display.

On the other hand, there is devised another technique in which a television set attached to the ceiling of a bus vehicle is not provided for the confirmation of safe conditions behind the bus vehicle but can be moved not to be a hindrance to a passenger who wants to move on a passageway in the bus vehicle.

JP-UM-A-1-74682 has disclosed a method in which a television set is attached to a front ceiling on a passageway in a bus vehicle and in which the position of the television set can be moved to a suitable position in accordance with the case where a passenger wants to move on the passageway and the case where a passenger wants to watch television. The television set moving system has a body frame attached between inside and outside panels of the ceiling of the bus vehicle, and a pulley-including movable table movably attached onto the body frame for fixing the television set. Since the driving power of the movable table is transmitted through a wire, the television set moving system can be made light in weight. Moreover, driving due to a motor and driving due to a manual driving unit can be changed over to each other by a clutch. Accordingly, the television set can be moved manually when the motor has trouble.

In the on-vehicle display device described in the related art, there is however fear that the rearward visibility of the driver may be blocked by the rear seat display if a rear seat passenger watches video on the rear seat display disposed in the ceiling portion. Accordingly, the driver cannot confirm safe conditions behind the vehicle sufficiently when the driver wants to confirm safe conditions behind the vehicle through the room mirror while driving the vehicle forward or when the driver wants to confirm safe conditions behind the vehicle directly by eye observation over the rearward area which the driver cannot confirm from the image on the rearward-looking camera while driving the vehicle In addition, whenever there is a change in the passenger's sitting state in each seat in the cabin, for example, whenever a passenger sitting in a rear seat moves left or right, whenever the number of passengers is changed or whenever a passenger gets off halfway, a passenger remaining in the cabin has to adjust the position and the direction of the display portion of the rear seat display manually or has to store the display portion of the rear seat display in its storage place. This results in a problem that the operation is troublesome and inconvenient.

SUMMARY OF THE INVENTION

The invention was developed to solve the foregoing problems. An object of the invention is to provide an on-vehicle display device which can obtain an optimal display condition in accordance with the current vehicle condition and the passenger's sitting state and which is prevented from blocking the rearward visibility of a driver.

According to one aspect of the invention, there is provided an on-vehicle display device including: a display unit installed in a cabin of a vehicle for displaying information; a vehicle condition detection unit for detecting a current vehicle condition; a sitting state detection unit for detecting a passenger's current sitting state in each of seats in the cabin; a rearward visibility detection unit for detecting rearward visibility of a driver; a determination unit for determining an optimal position and an optimal direction of a display portion of the display unit on the basis of the detected vehicle condition, the detected sitting state and the detected rearward visibility; and a drive unit for changing a position and a direction of the display portion of the display unit on the basis of a determination result obtained by the determination unit.

In the on-vehicle display device according to the invention, the vehicle condition detection unit detects the current vehicle condition on the basis of any one item selected from a group consisting of current position of the vehicle, speed of the vehicle, azimuth of the vehicle, driving gear position of the vehicle, brake condition of the vehicle, power-supply on/off condition of the vehicle, and existence of abnormality in the vehicle, or a combination of several items selected from the group.

In the on-vehicle display device according to the invention, the rearward visibility detection unit detects the rearward visibility of the driver due to rearward viewing directly or through a room mirror on the basis of a viewpoint position of the driver and an attachment position and an attachment angle of the room mirror.

In the on-vehicle display device according to the invention, the determination unit determines the position and the direction of the display portion so as to allow a passenger sitting in a rear seat to view display information on the display portion and prevent the display portion from blocking the rearward visibility of the driver through the room mirror, when it is detected that the vehicle is running and the passenger sits in the rear seat.

In the on-vehicle display device according to the invention, the determination unit determines the position and the direction of the display portion so as to allow all passengers sitting in rear seats to view display information on the display portion and prevent the display portion from blocking the rearward visibility of the driver through the room mirror, when it is detected that the vehicle is running and the passengers sit in the rear seats.

In the on-vehicle display device according to the invention, the determination unit determines the position and the direction of the display portion so as to allow a passenger sitting in an assistant driver's seat to view display information on the display portion and prevent the display portion from blocking the rearward visibility of the driver through the room mirror, when it is detected that the vehicle is running and the passenger sits in the assistant driver's seat while no passenger sits in any one of rear seats.

In the on-vehicle display device according to the invention, the determination unit determines the position and the direction of the display portion in a condition that the display portion will be received in a predetermined storage place, when it is detected that the vehicle is running and no passenger sits in any one of rear seats and an assistant driver's seat.

In the on-vehicle display device according to the invention, the determination unit determines the position and the direction of the display portion so as to prevent the display portion from blocking the rearward visibility of the driver due to rearward viewing directly or through the room mirror, when it is detected that the vehicle is being driven backward.

In the on-vehicle display device according to the invention, the determination unit determines the position and the direction of the display portion so as to allow all passengers sitting in the seats in the cabin to view display information on the display portion, when it is detected that the vehicle has been parked or stopped for a predetermined time or longer and the passengers sit in the seats in the cabin.

In the on-vehicle display device according to the invention, the determination unit determines the position and the direction of the display portion in a condition that the display portion will be received in a predetermined storage place, when it is detected that no passenger sits in any one of seats in the cabin.

In the on-vehicle display device according to the invention, the determination unit determines the position and the direction of the display portion in a condition that the display portion will be received in a predetermined storage place, when it is detected that a vehicle power supply has been turned off.

In the on-vehicle display device according to the invention, the determination unit determines the position and the direction of the display portion in a condition that the display portion will be received in a predetermined storage place, when abnormality is detected in the vehicle condition.

BRIEF DESCRIPTION OF THE DRAWINGS

These and other objects and advantages of this invention will become more fully apparent from the following detailed description taken with the accompanying drawings in which:

FIG. 3 is a flow chart showing a typical operation of the on-vehicle display device according to First embodiment of the invention;

DETAILED DESCRIPTION OF THE PREFERRED EMBODIMENTS

Embodiments of the invention will be described below with reference to the accompanying drawings.

First Embodiment

Figure 1:
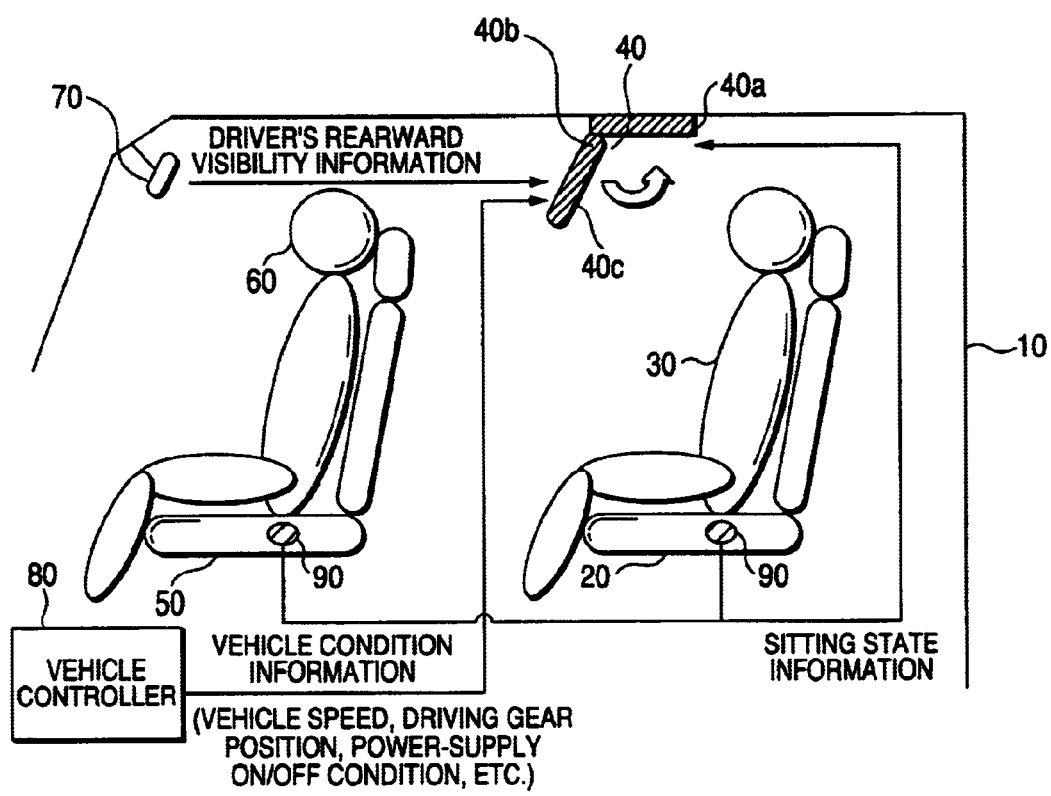
FIG. 1 is a schematic view showing the configuration of an on-vehicle display device according to First embodiment of the invention, as to how to dispose the on-vehicle display device in a cabin.

FIG. 1 is a schematic view showing the configuration of an on-vehicle display device according to First embodiment of the invention as to how to dispose the on-vehicle display device in a cabin.

A rear seat display 40 as a display unit is disposed on a ceiling portion in a cabin of a vehicle 10 so that a rear seat passenger 30 sitting in a rear seat 20 can view the rear seat display 40. With the rear seat display 40, the rear seat passenger 30 can enjoy various kinds of videos and sounds. The rear seat display 40 has a storage portion 40a, a rotary portion 40b and a display portion 40c. The storage portion 40a is movable desirably back and forth, and left and right on the ceiling portion by a drive mechanism such as a slide rail mechanism as will be described later. The display portion 40c is attached to the storage portion 40a rotatably three-dimensionally through the rotary portion 40b. When not in use, the display portion 40c is rotated in a direction of the arrow shown in FIG. 1, so as to be received in the storage portion 40a. When to be used, the display portion 40c is opened as shown in FIG. 1.

A reference numeral 70 designates a room mirror through which a driver 60 sitting in a front seat 50 can confirm safe conditions behind a vehicle 10. The attachment position or the setting angle of the room mirror 70 is designed to be detectable, for example, by a position sensor or an angle sensor (not shown). The viewpoint position of the driver 60 can be detected, for example, by an image pickup device (not shown) installed in the cabin. On the basis of the information from such sensors, the range of rearward visibility of the driver 60 due to rearward viewing directly or through the room mirror 70 is detected and transmitted as rearward visibility information to the rear seat display 40. Thus, a rearward visibility detection unit is formed.

A reference numeral 80 designates a vehicle controller for detecting conditions of the vehicle 10 such as its current position, its speed, its azimuth, its driving gear position, its brake condition, its power-supply on/off condition, and the existence of vehicle abnormality such as power supply voltage drop or overheat, and for outputting these vehicle conditions to the rear seat display 40 as vehicle condition information. Thus, a vehicle condition detection unit is formed.

The information of the vehicle 10 about the current position, the speed, the azimuth or the like is designed to be acquired from a navigation system (not shown) or the like built in or connected to the vehicle controller 80, and based on the absolute position, speed, and azimuth information obtained from a GPS receiver, a vehicle speed sensor, a gyro sensor, and the like.

The information of the vehicle 10 about the driving gear position and the brake condition, the vehicle power-supply on/off condition and the existence of vehicle abnormality is based on information obtained from various vehicle drive units (not shown) such as a shift lever, a foot brake, a parking brake, a power supply key switch and a meter panel connected to the vehicle controller 80.

A reference numeral 90 designates a sitting sensor constituted by a contact switch or the like provided in each of front and rear seats in the cabin. The seat sensor 90 generates a sitting detection signal when a passenger sits in a seat, and transmits the sitting detection signal to the rear seat display 40 as sitting state information. A plurality of seat sensors 90 may be disposed longitudinally in each of the front seats 20 and the rear seats 50. In this case, the sitting position of each passenger can be also detected. Thus, a sitting state detection unit is formed.

Figure 2:
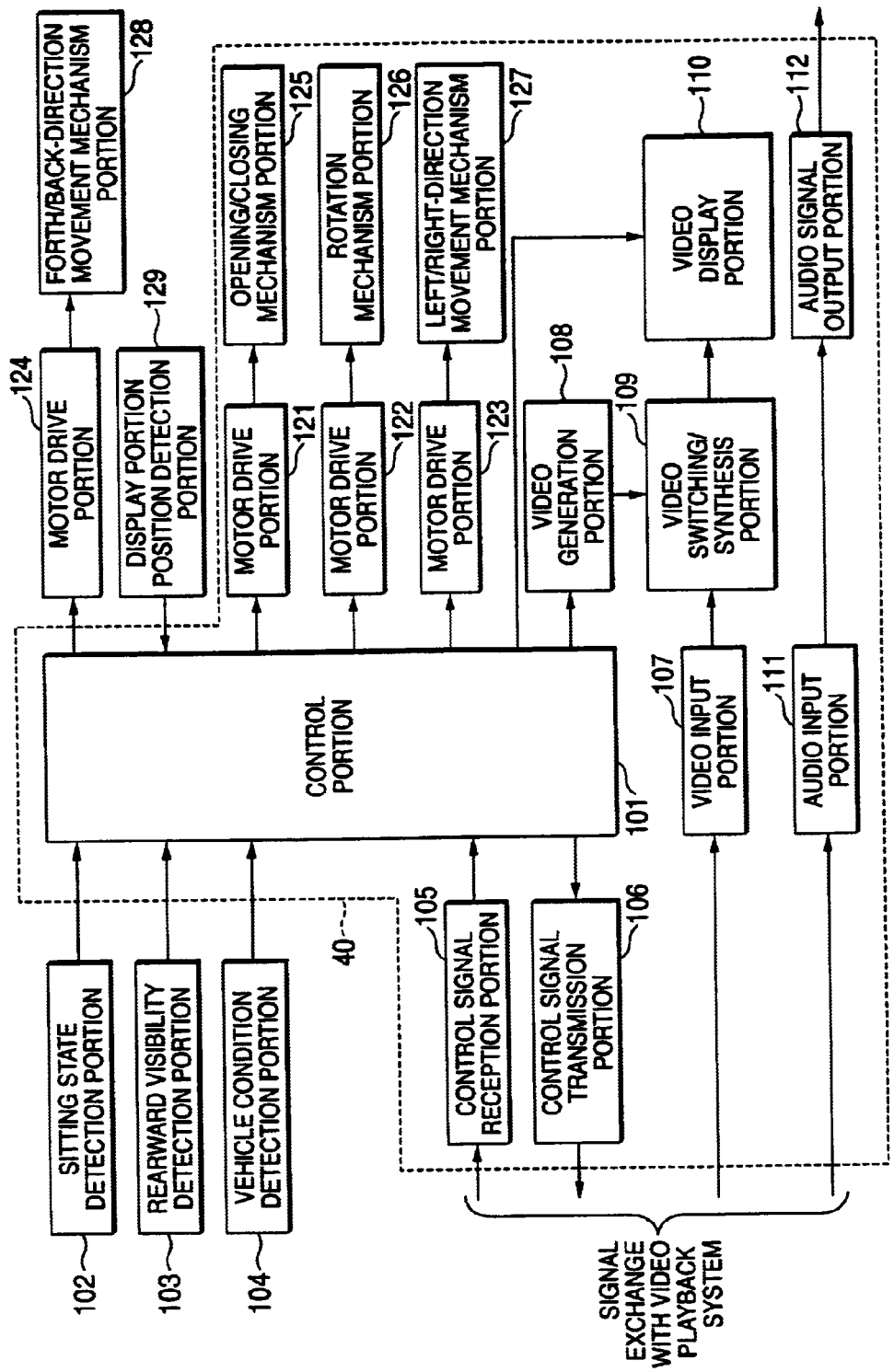
FIG. 2 is a block diagram showing the configuration of the on-vehicle display device according to First embodiment of the invention.

FIG. 2 is a block diagram showing the configuration of the on-vehicle display device according to First embodiment. A control portion 101 of the rear seat display 40 receives signals from a sitting state detection portion 102 as the sitting state detection unit, a rearward visibility detection portion 103 as the rearward visibility detection unit, a vehicle condition detection portion 104 as the vehicle condition detection unit, and the video playback system. The control portion 101 functions as a determination unit for determining an optimal position and an optimal direction of the display portion 40c of the rear seat display 40 on the basis of the detected vehicle condition, the detected sitting state and the detected rearward visibility.

A reference numeral 105 designates a control signal reception portion for receiving a control signal from the video playback system; and 106, a control signal transmission portion for transmitting a control signal to the video playback system. For example, when there is used a DVD player as the video playback system, the control signal reception portion 105 receives a signal indicating the status of the DVD player. The control signal transmission portion 106 transmits, for example, a command for changing a DVD signal track to the DVD player from the rear seat display 40 so as to control the DVD player.

A reference numeral 107 designates a video input portion for inputting a video signal from the video playback system;

a reference numeral 108 designates a video generation portion for generating a video from the control portion 101 such as a video image for informing the passenger of the vehicle conditions or the like by characters or an image; a reference numeral 109 designates a video switching/synthesis portion for switching/synthesizing videos from the video playback system and the control portion 101; and a reference numeral 110 designates a video display portion for displaying the generated video. In addition, a reference numeral 111 designates an audio input portion for inputting an audio signal from the video playback system; and 112, an audio signal output portion for outputting the inputted audio signal.

Reference numerals 121 to 124 are motor drive portions for operating drive mechanisms for changing the position and the azimuth of the display portion 40c of the rear seat display 40, respectively. The motor drive portions 121 to 124 drive the drive mechanisms of an opening/closing mechanism portion 125, a rotation mechanism portion 126, a left/right-direction movement mechanism portion 127, and a forth/back-direction movement mechanism portion 128, respectively. Desired mechanisms such as a link mechanism, a gear mechanism, a rotary mechanism, a rotatable arm mechanism and a slide rail mechanism are used as these drive mechanisms. A reference numeral 129 designates a display portion position detection portion for detecting the position and the direction of the display portion 40c of the rear seat display 40 by means of a position sensor and an angle sensor (not shown). The control portion 101 controls the driving of the motor drive portions 121 to 124 so as to locate the display portion 40c in a desired position and a desired direction while confirming the position and the direction of the display portion 40c detected by the display portion position detection portion 129. Thus, a drive unit is formed.

Next, the operation of the on-vehicle display device according to First embodiment will be described. FIG. 3 is a flow chart showing the typical operation of the on-vehicle display device according to First embodiment.

First, the control portion 101 imports the vehicle condition information of the vehicle 10 about the current position, the speed, the azimuth, the driving gear position, the brake condition, the vehicle power-supply on/off condition, the existence of vehicle abnormality, and the like, from the vehicle condition detection portion 104 (Step S11). Next, the control portion 101 imports the passenger's sitting state information in each of the front and rear seats in the cabin from the sitting state detection portion 102 (Step S12). Further, the control portion 101 imports the rearward visibility information of the driver 60 due to rearward viewing directly or through the room mirror 70, from the rearward visibility detection portion 103 (Step S13).

Next, the control portion 101 confirms the vehicle power-supply on/off condition on the basis of the vehicle condition information (Step S14). When the vehicle power supply is turned off, it is not necessary to make a display on the rear seat display 40. Therefore, the control portion 101 determines the position and the direction of the display portion 40c of the rear seat display 40 in a condition that the display portion 40c will be received in a predetermined storage place (Step S21).

When the vehicle power supply is turned on in Step S14, the control portion 101 confirms whether the vehicle is normal or abnormal based on the vehicle condition information (Step S15). When the vehicle is abnormal, it is not necessary to make a display on the rear seat display 40. Therefore, the control portion 101 determines the position and the direction of the display portion 40c of the rear seat display 40 in a condition that the display portion 40c will be received in the predetermined storage place (Step S21).

When there is no abnormality in the vehicle condition in Step S15, the control portion 101 confirms whether a passenger sits in any one of the seats in the cabin or not, based on the sitting state information (Step S16). When no passenger sits in any one of the seats in the cabin, it is not necessary to make a display on the rear seat display 40. Therefore, the control portion 101 determines the position and the direction of the display portion 40c of the rear seat display 40 in a condition that the display portion 40c will be received in the predetermined storage place (Step S21).

When it is recognized in Step S16 that a passenger sits in any one of the seats in the cabin, the control portion 101 confirms whether the driving gear position of the vehicle 10 is in a parking position or not, or whether the vehicle speed has been kept in the condition of 0 for at least a predetermined time or not, on the basis of the vehicle condition information (Step S17) When the driving gear position is in a parking position or the vehicle speed has been kept in the condition of 0 for at least a predetermined time, the control portion 101 concludes that the vehicle has been parked or stopped for a long time, and determines the position and the direction of the display portion 40c of the rear seat display 40 to allow all the passengers sitting in the seats to view the display portion 40c (Step S22).

When it is concluded in Step S17 that the driving gear position of the vehicle 10 is not in the parking position or the vehicle speed has not been kept in the condition of 0 for at least a predetermined time, the control portion 101 confirms whether the driving gear position of the vehicle 10 is in a reverse position or not on the basis of vehicle condition information (Step S18). When the driving gear position is in the reverse position, the control portion 101 concludes that the vehicle begins to be driven backward or is being driven backward and determines the position and the direction of the display portion 40c of the rear seat display 40 so as to prevent the display portion 40c from blocking the rearward visibility of the driver 60 due to rearward viewing directly or through the room mirror 70, on the basis of the rearward visibility information (Step S23).

When the driving gear position of the vehicle 10 is not in the reverse position in Step S18, the control portion 101 concludes that the vehicle is running forward and confirms whether a rear seat passenger 30 sits in any one of the rear seats 20 in the cabin or not on the basis of the sitting state information (Step S19). When it is recognized that a rear seat passenger 30 sits in any one of the rear seats 20, the control portion 101 determines the position and the direction of the display portion 40c of the rear seat display 40 so as to allow all the rear seat passengers 30 to view the display portion 40c and to prevent the display portion 40c from blocking the rearward visibility of the driver 60 through the room mirror 70, on the basis of the rearward visibility information (Step S25).

When it is recognized in Step S19 that no rear seat passenger 30 sits in any one of the rear seats 20, the control portion 101 confirms whether an assistant driver's seat passenger 65 sits in an assistant driver's seat 50b in the cabin or not on the basis of the sitting state information (Step S20). When it is recognized that the assistant driver's seat passenger 65 sits in the assistant driver's seat 50b, the control portion 101 determines the position and the direction of the display portion 40c of the rear seat display 40 so as to allow the assistant driver's seat passenger 65 to view the display portion 40c and to prevent the display portion 40c from blocking the rearward visibility of the driver 60 through the room mirror 70, on the basis of the rearward visibility information (Step S24).

When it is recognized in Step S20 that no assistant driver's seat passenger 65 sits in the assistant driver's seat 50*b*, it is not necessary to make a display on the rear seat display 40. Therefore, the control portion 101 determines the position and the direction of the display portion 40*c* of the rear seat display 40 in the condition that the display portion 40*c* will be received in the predetermined storage place (Step S21).

Finally, when the optimal position and the optimal direction of the display portion 40*c* of the rear seat display 40 are determined in the respective Steps S21 to S25, the control portion 101 controls the motor drive portions 121 to 124 to drive the drive mechanisms 125 to 128 so that the position and the direction of the display portion 40*c* are adjusted (Step S26).

Although the current vehicle conditions are judged on the basis of the information about the vehicle power-supply on/off condition, the existence of vehicle abnormality, the driving gear position, and the vehicle speed obtained from the vehicle condition detection portion 104 in the Steps S14, S15, S17 and S18, the vehicle conditions may be judged also in consideration of other information about the current position, the traveling azimuth, and the brake condition of the vehicle 10 obtained from the vehicle condition detection portion 104. Thus, the judgment accuracy can be made higher. For example, when the parking brake is applied to stop the vehicle at a place in the parking area, the control portion 101 may conclude that the vehicle is parked. On the other hand, when the vehicle is moved in a reverse direction to the forward azimuth of the vehicle, the control portion 101 may conclude that the vehicle is being driven backward.

In Step S21, assume that the position and the direction of the display portion 40*c* of the rear seat display 40 are determined in the condition that the display portion 40*c* will be received in the predetermined storage place. In this case, when the drive mechanisms are driven so that the display portion 40*c* is received in the predetermined place in Step S26, the power supply for displaying the rear seat display 40 may be turned off. Thus, power consumption can be saved.

In Step S26, the control portion 101 may judge and automatically adjust brightness, contrast and the like of the screen in the display portion 40*c* of the rear seat display 40 so that the passenger can view the screen most pleasantly. That is, the control portion 101 may control the video switching/synthesis portion 109 through the video generation portion 108 so as adjust brightness, contrast and the like of the video displayed on the video display portion 110. Thus, the visibility of the display screen can be further improved.

Figure 4:
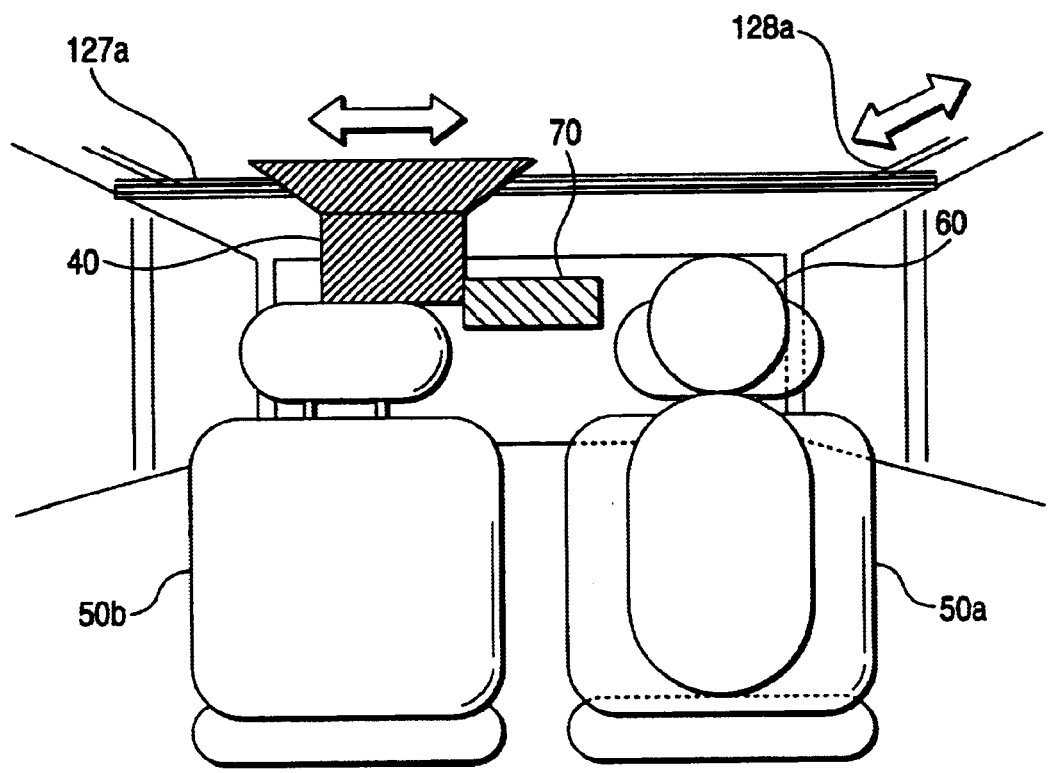
FIG. 4 is a schematic view showing an operation state of the on-vehicle display device viewed from its rear in the cabin according to First embodiment of the invention.
Figure 5:
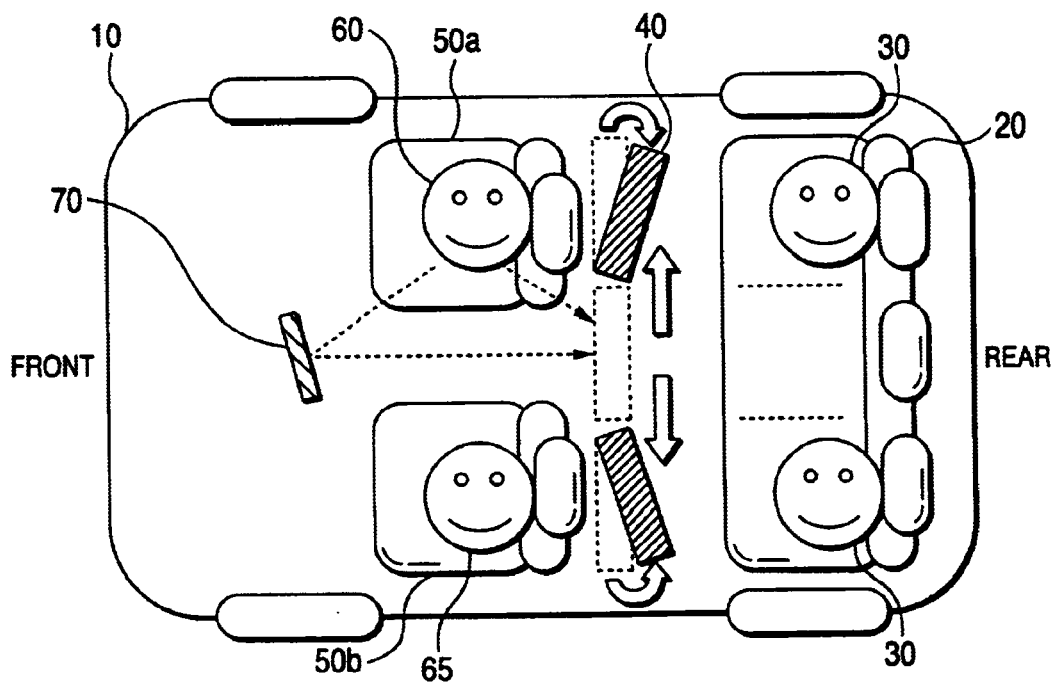
FIG. 5 is a schematic view showing the operation state of the on-vehicle display device viewed from its top in the cabin according to First embodiment of the invention.
Figure 6:
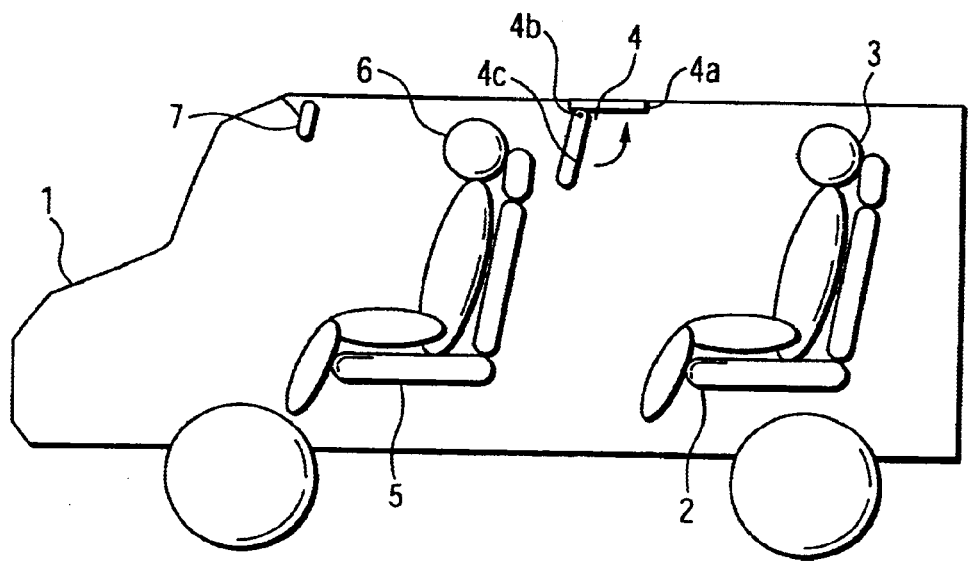
FIG. 6 is a schematic view showing a configuration of a related-art on-vehicle display device as to how to dispose the on-vehicle display device in a cabin.

FIGS. 4 and 5 shows an example of an operation state of the on-vehicle display device in the cabin according to First embodiment. FIG. 4 is a schematic view showing the operation state of the on-vehicle display device viewed from its rear in the cabin according to First embodiment. FIG. 5 is a schematic view showing the operation state of the on-vehicle display device viewed from its top in the cabin according to First embodiment. FIGS. 4 and 5 shows the example in which a slide rail mechanism is used as each of drive mechanisms of the left/right-direction movement mechanism portion 127 and the forth/back-direction movement mechanism portion 128 for the rear seat display 40 as shown in FIG. 2.

The display portion 40*c* of the rear seat display 40 is disposed so that the display portion 40*c* can be opened/closed and rotated by the opening/closing mechanism portion 125 and the rotation mechanism portion 126 and can be moved on the ceiling portion in the cabin by the slide rail mechanisms using a left/right-direction movement slide rail 127*a* and a forth/back-direction movement slide rail 128*a* respectively.

As shown in FIG. 4, when the driver 60 sits in the driver's seat 50*a* and drives the vehicle forward, the display portion 40*c* of the rear seat display 40 is moved in such a position and such a direction that the rearward visibility of the driver 60 through the room mirror 70 is not blocked and that a rear seat passenger 30 sitting in a rear seat 20 can view the display portion 40*c*. In addition, when the driver 60 drives the vehicle backward, the display portion 40*c* of the rear seat display 40 is moved in such a position and such a direction that the rearward visibility of the driver 60 due to rearward viewing directly is not blocked in addition to the aforementioned setting.

On the other hand, as shown in FIG. 5, when the driver 60 drives the vehicle forward with a plurality of rear seat passengers 30 sitting in the rear seats 20, the display portion 40*c* of the rear seat display 40 is moved in such a position and such a direction that the rearward visibility of the driver 60 through the room mirror 70 is not blocked and that the rear seat passengers 30 sitting in the rear seats 20 can view the display portion 40*c*. In addition, when the driver 60 drives the vehicle backward in such a state, the display portion 40*c* of the rear seat display 40 is moved in such a position and such a direction that the rearward visibility of the driver 60 due to rearward viewing directly is not blocked in addition to the aforementioned setting.

In FIG. 5, when the driver 60 drives the vehicle forward with no rear seat passenger 30 sitting in any one of the rear seats 20 but with an assistant driver's seat passenger 65 sitting in the assistant driver's seat 50*b*, the display portion 40*c* of the rear seat display 40 may be moved in such a position and such a direction that the rearward visibility of the driver 60 through the room mirror 70 is not blocked and that the assistant driver's seat passenger 65 can view the display portion 40*c* while looking forward. When the driver 60 drives the vehicle backward, the display portion 40*c* is moved in such a position and such a direction that the rearward visibility of the driver 60 due to rearward viewing directly is not blocked in addition to the aforementioned setting.

In addition, in FIG. 5, when the vehicle 10 has been stopped for a long time with a plurality of passengers 30 sitting in the rear seats 20 and with an assistant driver's seat passenger 65 sitting in the assistant driver's seat 50*b*, the display portion 40*c* of the rear seat display 40 may be moved in such a position and such a direction that all the passengers including the driver 60 can view the display portion 40*c* while looking forward.

According to First embodiment, the position and the direction of the display portion 40*c* of the rear seat display 40 are changed to an optimal condition in accordance with the current vehicle condition, the sitting state of each passenger and the rearward visibility of the driver 60. Accordingly, there can be obtained an optimal display condition satisfying the current vehicle condition and the sitting state of each passenger while preventing the display portion 40*c* from blocking the rearward visibility of the driver 60.

According to First embodiment, the current vehicle condition is detected on the basis of any one item selected from a group consisting of the current position of the vehicle 10, the speed of the vehicle 10, the azimuth of the vehicle 10, the driving gear position of the vehicle 10, the brake condition of the vehicle 10, the vehicle power-supply on/off condition and the existence of abnormality in the vehicle 10, or a combination of several items selected from the group. Accordingly, the current vehicle condition can be detected accurately.

According to First embodiment, the rearward visibility of the driver 60 due to rearward viewing directly or through the room mirror 70 is detected on the basis of the viewpoint position of the driver 60 and the attachment position and the attachment angle of the room mirror 70. Accordingly, the rearward visibility of the driver 60 can be detected accurately.

According to First embodiment, when the vehicle 10 is running and a rear seat passenger 30 sits in a rear seat 20, the position and the direction of the display portion 40c are set such that the rear seat passenger 30 can view the display image and the rearward visibility of the driver 60 through the room mirror 70 is not blocked. Accordingly, there can be obtained a pleasant display condition in which the rear seat passenger 30 can view the display image and the rearward visibility of the driver 60 is not blocked.

According to First embodiment, when the vehicle 10 is running and a plurality of rear seat passengers 30 sit in rear seats 20, the position and the direction of the display portion 40c are set such that all the rear seat passengers 30 can view the display image and the rearward visibility of the driver 60 through the room mirror 70 is not blocked. Accordingly, there can be obtained a pleasant display condition in which the rear seat passengers 30 can view the display image together and the rearward visibility of the driver 60 is not blocked.

According to First embodiment, when the vehicle 10 is running and an assistant driver's seat passenger 65 sits in the assistant driver's seat 50b while no rear seat passenger 30 sits in any one of the rear seats 20, the position and the direction of the display portion 40c are set such that the assistant driver's seat passenger 65 can view the display image and the rearward visibility of the driver 60 through the room mirror 70 is not blocked. Accordingly, there can be obtained a pleasant display condition in which the assistant driver's seat passenger 65 can view the display image and the rearward visibility of the driver 60 is not blocked.

According to First embodiment, when the vehicle 10 is running with no passenger sitting either in the assistant driver's seat 50b or in the rear seats 20, the display portion 40c is received in a predetermined storage place. Accordingly, there can be obtained a pleasant condition in which the driver 60 can concentrates on driving and the rearward visibility of the driver 60 is not blocked.

According to First embodiment, when the vehicle 10 is being driven backward, the position and the direction of the display portion 40c are set such that the rearward visibility of the driver 60 due to rearward viewing directly or through the room mirror 70 is not blocked. Accordingly, there can be obtained a pleasant condition in which the rearward visibility of the driver 60 during driving the vehicle 10 backward is not blocked.

According to First embodiment, when the vehicle 10 has been parked or stopped for a predetermined time or longer with passengers sitting in the seats in the cabin, the position and the direction of the display portion 40c are set such that all the passengers sitting in the seats in the cabin can view the display image. Accordingly, there can be obtained a pleasant display condition in which all the passengers sitting in the seats in the cabin can view the display image while the vehicle has been parked or stopped for a predetermined time or longer.

According to First embodiment, when no passenger sits in any one of the seats in the cabin at all, the display portion 40c is received in the predetermined storage place. Accordingly, it is possible to avoid an unnecessary display state when no passenger sits in any one of the seats in the cabin at all.

According to First embodiment, when the vehicle power supply is turned off, the display portion 40c is received in the predetermined storage place. Accordingly, it is possible to avoid an unnecessary display state when the vehicle power supply is turned off.

According to First embodiment, when the vehicle condition is abnormal, the display portion 40c is received in the predetermined storage place. Accordingly, it is possible to avoid an unnecessary display state when the vehicle condition is abnormal.

Although the embodiment has shown the case where the rear seat display 40 constituted by a liquid crystal display is used as the display unit, various kinds of displays such as a CRT (Cathode Ray Tube) display, a plasma display, an EL (Electro Luminescence) display, an LED (light Emitting Diode) display, a VFD (Vacuum Fluorescent Display), a projection type display, a head-up display, and a head mount display may be used.

In addition, although the embodiment has shown the case where a GPS receiver, a vehicle speed sensor, a gyro sensor, and the like are used for detection of the current position, the speed and the azimuth of the vehicle 10 in the vehicle condition detection unit, other sensors such as a geomagnetic sensor and an acceleration sensor, or sensors using a wireless network such as a D-GPS (Differential GPS), map matching based on map information, a position information service used in a PHS or a portable phone may be used.

Although the embodiment has shown the case where a sitting sensor 90 constituted by a contact switch is used as the sitting state detection unit, a pressure sensor using a piezoelectric element, a weight sensor, a human body detection sensor based on detection using radiation temperature in the cabin, a monitor camera for monitoring the state in the cabin by an image, and the like, may be used.

Although the embodiment has shown the case where a method for detecting the rearward visibility of the driver 60 on the basis of the viewpoint position of the driver 60 and the attachment position and the attachment angle of the room mirror 70 is used as the rearward visibility detection means, a method using a monitor camera or the like for monitoring the rearward visibility of the driver 60 from the driver's seat 50a in the cabin may be used.

Although the embodiment has shown the case where moving drive mechanisms constituted by a forth/back-direction slide rail and a left/right-direction slide rail on the ceiling portion in the cabin of the vehicle 10 are used as the drive units, the invention is not limited thereto. Other mechanisms may be used if they are drive mechanisms which can move in the cabin.

Although the embodiment has mainly shown the case where the rear seat display device is installed on the ceiling portion in the cabin of the vehicle 10, the invention is not limited thereto. The invention may be applied to a display device which is installed in a place other than the ceiling portion in the cabin or which is not mainly used for the rear seats.

Although the embodiment has mainly shown the case where the invention is applied to the display device mounted in an automobile, it is a matter of course that the same effect can be obtained also in the case where the invention is applied to a display device mounted in any other mobile body such as a bus, a train, a ship or an airplane, any other information display system, or any other image/video viewing system.

Since the invention is configured as described above, the invention can obtain the following effects.

According to the invention, there is provided an on-vehicle display device including: a display unit installed in a cabin of a vehicle for displaying information; a vehicle condition detection unit for detecting a current vehicle condition; a sitting state detection unit for detecting a passenger's current sitting state in each of seats in the cabin; a rearward visibility detection unit for detecting rearward visibility of a driver due to rearward viewing directly or through a room mirror, on the basis of a viewpoint position of the driver and an attachment position and an attachment angle of the room mirror; a determination unit for determining an optimal position and an optimal direction of a display portion of the display unit based on the detected vehicle condition, the detected sitting state and the detected rearward visibility; and a drive unit for changing a position and a direction of the display portion of the display unit based on a determination result obtained by the determination unit. Accordingly, there is an effect that an optimal display condition in accordance with the current vehicle condition and the passenger's sitting state can be obtained, and an on-vehicle display device prevented from blocking the rearward visibility of the driver can be provided.

In the on-vehicle display device according to the invention, the vehicle condition detection unit detects the current vehicle condition based on any one item selected from a group consisting of the current position of the vehicle, the speed of the vehicle, the azimuth of the vehicle, the driving gear position of the vehicle, the brake condition of the vehicle, the vehicle power-supply on/off condition, and the existence of abnormality in the vehicle, or a combination of several items selected from the group. Accordingly, there is an effect that the current vehicle condition can be detected accurately.

In the on-vehicle display device according to the invention, the rearward visibility detection unit detects the rearward visibility of the driver due to rearward viewing directly or through the room mirror, on the basis of a viewpoint position of the driver and an attachment position and an attachment angle of the room mirror. Accordingly, there is an effect that the rearward visibility of the driver can be detected accurately.

In the on-vehicle display device according to the invention, when it is detected that the vehicle is running and a passenger sits in a rear seat, the determination unit determines the position and the direction of the display portion so as to allow the passenger sitting in the rear seat to view display information on the display portion and prevent the display portion from blocking the rearward visibility of the driver through the room mirror. Accordingly, there is an effect that there can be obtained a pleasant display condition in which the rear seat passenger can view the display image and the rearward visibility of the driver is not blocked.

In the on-vehicle display device according to the invention, when it is detected that the vehicle is running and a plurality of passengers sit in rear seats, the determination unit determines the position and the direction of the display portion so as to allow all the passengers sitting in the rear seats to view display information on the display portion and prevent the display portion from blocking the rearward visibility of the driver through the room mirror. Accordingly, there is an effect that there can be obtained a pleasant display condition in which the rear seat passengers can view the display image together and the rearward visibility of the driver is not blocked.

In the on-vehicle display device according to the invention, when it is detected that the vehicle is running and a passenger sits in an assistant driver's seat while no passenger sits in any one of rear seats, the determination unit determines the position and the direction of the display portion so as to allow the passenger sitting in the assistant driver's seat to view display information on the display portion and prevent the display portion from blocking the rearward visibility of the driver through the room mirror. Accordingly, there is an effect that there can be obtained a pleasant display condition in which the assistant driver's seat passenger can view the display image and the rearward visibility of the driver is not blocked.

In the on-vehicle display device according to the invention, when it is detected that the vehicle is running and no passenger sits either in any rear seat or in an assistant driver's seat, the determination unit determines the position and the direction of the display portion in a condition that the display portion will be received in a predetermined storage place. Accordingly, there is an effect that there can be obtained a pleasant condition in which the driver can concentrate on driving and the rearward visibility of the driver is not blocked.

In the on-vehicle display device according to the invention, when it is detected that the vehicle is being driven backward, the determination unit determines the position and the direction of the display portion so as to prevent the display portion from blocking the rearward visibility of the driver due to rearward viewing directly or through the room mirror. Accordingly, there is an effect that there can be obtained a pleasant condition in which the rearward visibility of the driver during driving the vehicle backward is not blocked.

In the on-vehicle display device according to the invention, when it is detected that the vehicle has been parked or stopped for a predetermined time or longer and passengers sit in the seats in the cabin, the determination unit determines the position and the direction of the display portion so as to allow all the passengers sitting in the seats in the cabin to view display information on the display portion. Accordingly, there is an effect that there can be obtained a pleasant display condition in which all the passengers sitting in the seats in the cabin can view the display image while the vehicle has been parked or stopped for a predetermined time or longer.

In the on-vehicle display device according to the invention, when it is detected that no passenger sits in any one of the seats in the cabin, the determination unit determines the position and the direction of the display portion in a condition that the display portion will be received in a predetermined storage place. Accordingly, there is an effect that it is possible to avoid an unnecessary display state when no passenger sits in any one of the seats in the cabin at all.

In the on-vehicle display device according to the invention, when it is detected that vehicle power supply has been turned off, the determination unit determines the position and the direction of the display portion in a condition that the display portion will be received in the predetermined storage place. Accordingly, there is an effect that it is possible to avoid an unnecessary display state when the vehicle power supply is turned off.

In the on-vehicle display device according to the invention, when abnormality is detected in the vehicle condition, the determination unit determines the position and the direction of the display portion in a condition that the display portion will be received in the predetermined storage place. Accordingly, there is an effect that it is possible to avoid an unnecessary display state when the vehicle condition is abnormal.

What is claimed is:

1. An on-vehicle display device comprising:
   a display unit installed in a cabin of a vehicle for displaying information;
   a vehicle condition detection unit for detecting a current vehicle condition;
   a sitting state detection unit for detecting a passenger's current sitting state in each of seats in said cabin;
   a rearward visibility detection unit for detecting rearward visibility of a driver;
   a determination unit for determining an optimal position and an optimal direction of a display portion of said display unit on the basis of said detected vehicle condition, said detected sitting state and said detected rearward visibility; and
   a drive unit for changing a position and a direction of said display portion of said display unit on the basis of a determination result obtained by said determination unit.

2. An on-vehicle display device according to claim 1, wherein said vehicle condition detection unit detects said current vehicle condition on the basis of any one item selected from a group consisting of current position of said vehicle, speed of said vehicle, azimuth of said vehicle, driving gear position of said vehicle, brake condition of said vehicle, power-supply on/off condition of said vehicle, and existence of abnormality in said vehicle, or a combination of several items selected from said group.

3. An on-vehicle display device according to claim 1, wherein said rearward visibility detection unit detects said rearward visibility of said driver due to rearward viewing directly or through a room mirror on the basis of a viewpoint position of said driver and an attachment position and an attachment angle of said room mirror.

4. An on-vehicle display device according to claim 1, wherein said determination unit determines said position and said direction of said display portion so as to allow a passenger sitting in a rear seat to view display information on said display portion and prevent said display portion from blocking said rearward visibility of said driver through said room mirror, when it is detected that said vehicle is running and said passenger sits in said rear seat.

5. An on-vehicle display device according to claim 1, wherein said determination unit determines said position and said direction of said display portion so as to allow all passengers sitting in rear seats to view display information on said display portion and prevent said display portion from blocking said rearward visibility of said driver through said room mirror, when it is detected that said vehicle is running and said passengers sit in said rear seats.

6. An on-vehicle display device according to claim 1, wherein said determination unit determines said position and said direction of said display portion so as to allow a passenger sitting in an assistant driver's seat to view display information on said display portion and prevent said display portion from blocking said rearward visibility of said driver through said room mirror, when it is detected that said vehicle is running and said passenger sits in said assistant driver's seat while no passenger sits in any one of rear seats.

7. An on-vehicle display device according to claim 1, wherein said determination unit determines said position and said direction of said display portion in a condition that said display portion will be received in a predetermined storage place, when it is detected that said vehicle is running and no passenger sits in any one of rear seats and an assistant driver's seat.

8. An on-vehicle display device according to claim 1, wherein said determination unit determines said position and said direction of said display portion so as to prevent said display portion from blocking said rearward visibility of said driver due to rearward viewing directly or through said room mirror, when it is detected that said vehicle is being driven backward.

9. An on-vehicle display device according to claim 1, wherein said determination unit determines said position and said direction of said display portion so as to allow all passengers sitting in said seats in said cabin to view display information on said display portion, when it is detected that said vehicle has been parked or stopped for a predetermined time or longer and said passengers sit in said seats in said cabin.

10. An on-vehicle display device according to claim 1, wherein said determination unit determines said position and said direction of said display portion in a condition that said display portion will be received in a predetermined storage place, when it is detected that no passenger sits in any one of seats in said cabin.

11. An on-vehicle display device according to claim 1, wherein said determination unit determines said position and said direction of said display portion in a condition that said display portion will be received in a predetermined storage place, when it is detected that a vehicle power supply has been turned off.

12. An on-vehicle display device according to claim 1, wherein said determination unit determines said position and said direction of said display portion in a condition that said display portion will be received in a predetermined storage place, when abnormality is detected in said vehicle condition.

* * * * *